United States Patent [19]

Himmler

[11] Patent Number: 5,481,912
[45] Date of Patent: Jan. 9, 1996

[54] METHOD AND APPARATUS FOR DYNAMICALLY BALANCING A ROTARY MEMBER

[75] Inventor: Gunther Himmler, Darmstadt, Germany

[73] Assignee: Hofmann Maschinenbau GmbH, Germany

[21] Appl. No.: 160,863

[22] Filed: Dec. 3, 1993

[30] Foreign Application Priority Data

Dec. 4, 1992 [DE] Germany ............ 42 40 7877

[51] Int. Cl.$^6$ .................. G01M 1/16; G01L 25/00
[52] U.S. Cl. .................. 73/460; 73/1 DV
[58] Field of Search .......... 73/1 C, 1 B, 1 D, 73/1 DV, 1 R, 460, 468, 469, 470, 462, 457; 364/463, 508

[56] References Cited

U.S. PATENT DOCUMENTS

| | | | |
|---|---|---|---|
| 3,681,967 | 8/1972 | Hines et al. | 73/1 B |
| 3,782,217 | 1/1974 | Wortley | 73/457 |
| 4,015,480 | 4/1977 | Giers | 73/462 |
| 4,162,634 | 7/1979 | Hofmann | 73/462 |
| 4,193,304 | 3/1980 | Hofmann | 73/462 |
| 4,201,091 | 5/1980 | Guyot et al. | 73/462 |
| 4,267,730 | 5/1981 | Curchod et al. | 73/462 |
| 4,285,240 | 8/1981 | Gold | 73/462 |
| 4,366,707 | 1/1983 | Jarschel | 73/462 |
| 4,494,400 | 1/1985 | Hill | 73/1 B |
| 4,555,943 | 12/1985 | Ohta et al. | 73/457 |

OTHER PUBLICATIONS

Hermann Brunnengraber, Peter Drust, "Hoffman Info #2", Measuring Methods for the Balancing Technique Revised 2 ed.

Primary Examiner—Hezag331.3 Williams
Assistant Examiner—Christine K. Oda
Attorney, Agent, or Firm—Cushman Darby & Cushman

[57] ABSTRACT

A method and apparatus for dynamically balancing a rotary member by mass compensation in first and second correction planes on the rotary member, wherein in dependence on the rotary member mass, its mass moment of inertia, the measuring speed of rotation and the spacing of the correction planes from the measuring planes, measurement value vectors which are supplied by measuring sensors in the measuring planes are turned through angles which are obtained from a respective stored family of curves produced by means of test runs. Each family of curves represents phase shifts of the measurement vectors relative to the correction vectors in the correction planes in dependence on the rotary member mass, the mass moment of inertia, the speed of measuring rotation and the spacing of the rotary member or the correction plane from the measuring plane.

6 Claims, 2 Drawing Sheets

METHOD AND APPARATUS FOR DYNAMICALLY BALANCING A ROTARY MEMBER

BACKGROUND OF THE INVENTION

One form of method of dynamically balancing a rotary member, such as a motor vehicle wheel, by mass correction in two correction or balancing planes on the rotary member involves carrying out calibration runs for ascertaining transformation characteristics of a measuring assembly in which measurement value vectors are ascertained as the effects of unbalance of the rotary member in measuring planes of the measuring assembly. Those characteristics of the measuring assembly are then stored. In dependence on the stored characteristics, correction or balancing vectors are then ascertained from the measurement value vectors, in a plane-computing means, for mass correction or balancing which is to be effected in the two correction planes of the rotary member.

However the system which consists of the rotary member to be balanced and its mounting in the measuring assembly is a spring-mass-damper system which is excited at the measurement speed of rotation of the rotary member by the centrifugal force caused by unbalance of the rotary member. Bearing anisotropy phenomena and other mechanical and electrical aspects of the measuring assembly also have an effect on the measurement results produced. That gives rise to phase shifts as between the measured and the actual unbalances of the rotary member. That aspect becomes clearly apparent in the plane separation operation which indicates the influence of an unbalance existing in the one correction plane, on the display of unbalance provided by the measuring assembly with respect to the other correction plane. The ideal in that respect would be a display 0 in the other plane.

SUMMARY OF THE INVENTION

An object of the present invention is to provide a method of dynamically balancing a rotary member which can afford improved plane separation.

Another object of the present invention is to provide a method of dynamically balancing a rotary member in first and second correction planes thereon, which can give results of enhanced accuracy while being of greater user-friendliness.

Still another object of the present invention is to provide a method of dynamically balancing a rotary member which affords greater reliability and versatility.

Yet a further object of the present invention is to provide an apparatus for use in the dynamic balancing of a rotary member by the evaluation of measurement signals representing measurement vectors to provide improved plane separation and enhanced operational accuracy.

In accordance with the principles of the present invention in a first aspect the foregoing and other objects are attained by a method of dynamically balancing a rotary member, for example a motor vehicle wheel, in first and second correction or balancing planes on the rotary member, wherein a measuring run is effected to ascertain measurement value vectors as effects of unbalance of the rotary member in measurement planes of a measuring assembly. The measurement value vectors are turned through correction phase angles which are specific to the rotary member and which are dependent on rotary member parameters. The correction phase angles have been ascertained in calibration runs on the measuring assembly, and stored in a family of characteristic curves. Correction or balancing vectors are determined in the correction planes on the rotary member, from the turned measurement value vectors, in a plane-computing means or plane separation (nodal) network. Unbalance correction is effected in accordance with mass and angular position, in dependence on the correction vectors ascertained in the above-indicated fashion, on the rotary member in the appropriate correction planes.

Rotary member unbalance measurement may be effected by the procedure which is referred to as travel-measuring, that is to say involving a soft bearing (above resonance) mounting for the measuring spindle, in which the arrangement operates at an operating speed above the natural frequency of the system consisting of the rotary member and its mounting assembly. Alternatively unbalance measurement can be effected by the procedure which is referred to as force-measuring, that is to say involving a hard bearing (below resonance) mounting for the measuring spindle, in which the arrangement operates at an operating speed below the natural frequency of the system consisting of the rotary member and its mounting. In the latter case the transfer conditions of the plane-computing means are based on static equilibrium conditions. By virtue of the rotation of the measurement value vectors through the correction phase angles, the procedure gives corrected measurement values which are free from phase shifts that are dependent on the mass of the rotary member, the mass moment of inertia, bearing anisotropy, (a damping effect caused by the bearing system) the speed of rotation of the rotary member (in particular when it is in the vicinity of the resonance range) and other influences. The correction phase angles which are specific to the rotary member involved can be ascertained in calibration runs on the measuring assembly and suitably stored in a storage means or memory in the form of families of curves or characteristics.

The corrected measurement value vectors are fed to the plane-computing means which is of conventional design configuration and which therefore does not need to be described in greater detail herein. The plane-computing means operates in accordance with a linear system of equations which is designed in consideration so-to-speak of the law of levers, to transfer the corrected measurement value vectors to the correction planes on the rotary member, being the planes in which unbalance correction or balancing is to be carried out. The above-mentioned linear system of equations is known and is discussed in detail for example in the book by Klaus Federn entitled 'Auswuchttechnik', Volume 1, 'Allgemeine Grundlagen, Messverfahren und Richtlinien', 1977 Edition, pages 41–43 or Hofmann Info 2 (Imprint 05.88), to which reference is therefore directed for more detailed information.

In the operation of ascertaining the above-mentioned family of characteristic curves, for a plurality of calibration rotary members each having a respective calibration unbalance and involving different rotary member parameters, for example masses, dimensions, mass moments of inertia, distances of the test unbalances from the measurement planes and speeds of rotation of the rotary members, the phase shifts in the two measurement planes relative to the angular positions of the test unbalances in dependence on the parameters of the respective rotary members are measured in two or more calibration runs, and the results obtained are suitably stored. The phase shifts as between the measurement value vectors and the test unbalance vectors are ascertained in particular in dependence on at least two of the parameters involved, for example the measurement speed of rotation and the mass moment of inertia, both in the procedure for ascertaining the family of characteristics curves involved and also in the procedure for evaluating the measurement value vectors to provide for dynamic unbalance correction. The phase shifts can also be additionally made dependent on a mean moment unbalance of the rotary member.

In accordance with a further aspect of the invention the foregoing and other objects are achieved by an apparatus for evaluating measurement signals which represent measurement value vectors and which are supplied as the effects of unbalance of the rotary member by first and second measuring sensors in different measuring planes of the rotary member, in an unbalance measuring apparatus, comprising a plane-computing means which can also be referred to as a plane separation (nodal) network, as an electrical circuit for performing a plane-separation function electrically, and which thus effects transformation of the measurement value vectors into correction vectors for unbalance correction or balancing in first and second correction planes. Connected between each of the first and second measuring sensors and the plane-computing means are respective rotary matrix computing means which are each connected to a respective storage means for storing phase differences which are specific to the rotary member as between the measurement value vectors and the correction vectors in dependence on given rotary member parameters, in the form of a family of curves. The rotary matrix computing means turn the measurement value vectors supplied by the measuring sensors through respective phase angles which are taken in dependence on at least first and second rotary member parameters from the family of curves in the storage means.

The at least two rotary member parameters in dependence on which the respective correction phase angles are taken from the family of curves may be for example the mass moment of inertia, the spacing of the respective correction planes of the rotary member to be balanced from the measuring planes, or the speed of rotation of the rotary member.

Further objects, features and advantages of the present invention will be apparent from the following description of a preferred embodiment.

DESCRIPTION OF THE PREFERRED EMBODIMENT

Figure 1:
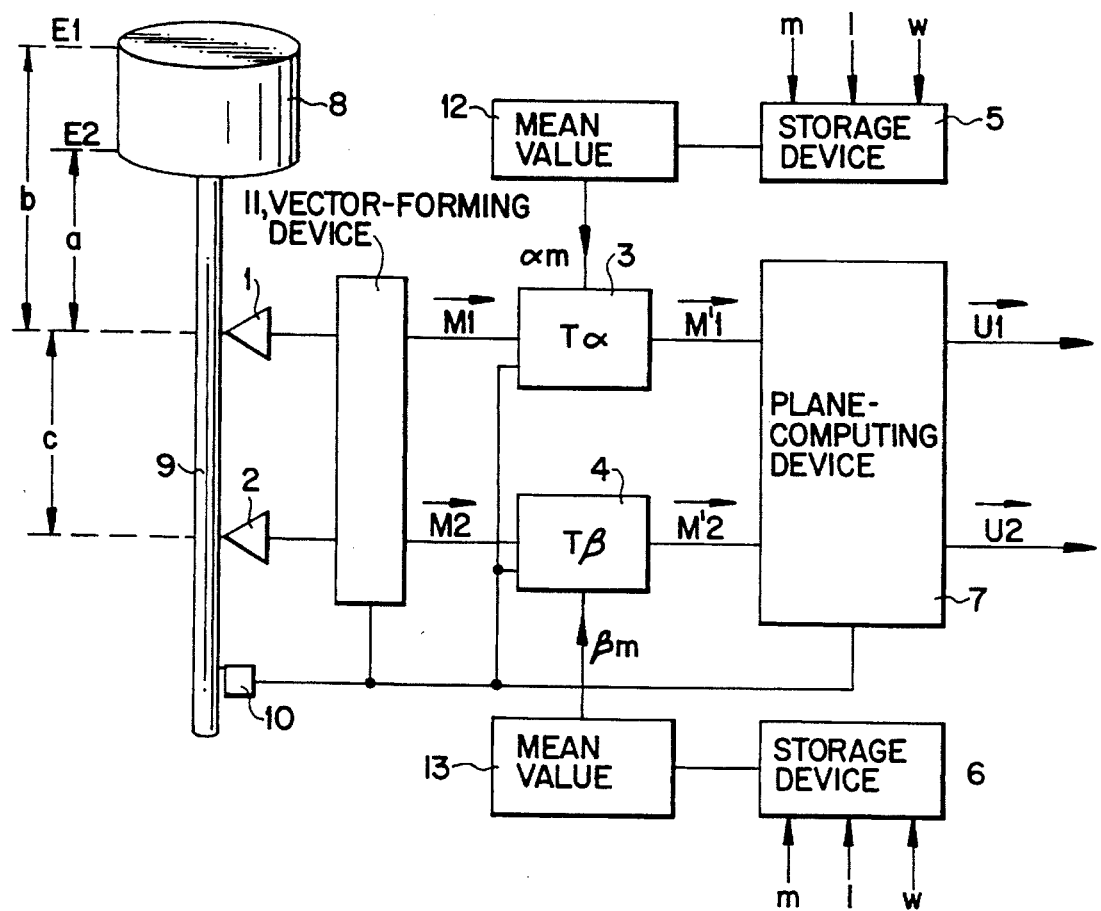
FIG. 1 shows a block circuit diagram of an unbalance measuring apparatus with measurement signal evaluation assembly connected thereto, FIG. 2 diagrammatically shows a family of curves which are stored in different sections of storage means employed in the illustrated structure.

Referring firstly to FIG. 1, shown therein is an unbalance measuring apparatus comprising a measuring spindle 9 on which a rotary member 8 to be measured, for example a motor vehicle wheel, can be clamped for a measuring operation by means of a known clamping arrangement (not shown). Reference numerals 1 and 2 identify measurement value sensors or detectors which are disposed at bearing locations of the measuring spindle 9. The illustrated unbalance measuring apparatus is a so-called hard-bearing or below-resonance balancing machine which has an operating speed below the natural frequency of the system consisting of the rotary member and its mounting assembly. This machine therefore operates in the sub-critical range of speed of rotation of the rotary member 8 to be balanced, to ascertain the measurement signals required for unbalance correction. The measurement signals are thus produced by means of the measurement value sensors 1 and 2 which measure the forces occurring at the mounting locations of the measuring spindle 9. The illustrated configuration of the measuring apparatus involves an overhung mounting for the rotary member 8, in which therefore first and second correction planes as indicated at E1 and E2 are outside the mounting or measuring planes of the measuring spindle 9; this is a configuration which is generally used when balancing motor vehicle wheels.

It will be appreciated however that the method and apparatus according to the invention can also be used in relation to balancing machines which operate in a supercritical range of speed of rotation, that is to say with an operating speed above the natural frequency of the system consisting of the rotary member and its mounting, using travel-measuring sensors.

To correct unbalance of the rotary member 8, mass correction is effected on the rotary member 8 at correction planes E1 and E2 thereof, for example by the addition of correction or balancing weights, when the rotary member 8 is a motor vehicle wheel. The upper correction plane E1 in FIG. 1 is at a spacing b from the upper measuring plane in which the measurement value sensor 1 is arranged. The lower correction plane E2 is at a spacing a from the upper measurement plane containing the measurement value sensor 1. The two measurement planes at which the measurement value sensors 1 and 2 are arranged are at a spacing c from each other. Those spacings are identified by 5 in FIG. 2.

The first and second measurement value sensors 1 and 2 are connected to an evaluation unit or circuit 11 constituting a vector-forming means, in which the electrical output signals of the measurement value sensors 1 and 2 are combined with the output of a reference angle sensor 10 operatively associated with the measuring spindle 9. Circuits of this kind which operate on the principle of phase-sensitive rectification or on the basis of a watt meter process or an autotracking process (see the publication Hofmann-Info 2, 'Messverfahren in der Auswuchttechnik', Imprint 05.88 to which reference has already been made above) are known and therefore do not need to be described in greater detail herein.

Because of the vibrational characteristics of the system which consists of the rotary member and the mounting thereof and which is a spring-mass-damper system, phase shifts occur in the operation of determining an unbalance of the rotary member in the measuring planes in which the first and second measurement value sensors 1 and 2 are disposed. Such phases shifts are also dependent on the mounting anisotropy and mechanical-electrical properties of the measuring apparatus, in particular of the measurement value sensors 1 and 2 and the operative coupling thereof to the measuring spindle 9.

Such a phase shift will cause falsification of the measurement values obtained, and thus the measurement value vectors which are determined in the evaluation unit 11, which are used in determining the magnitude and angular position of unbalance of the rotary member 8.

In order to compensate for that phase shift, the illustrated apparatus has rotary matrix computing devices 3 and 4 which are connected to the evaluation unit 11 and which are operative to turn the two measurement value vectors M1 and M2 supplied by the evaluation unit 11, in respect of their phase, in such a way as to compensate for the above-mentioned phase shifts which have the effect of falsifying the measurement values produced. Rotary angles corresponding to the amounts by which the measurement value vectors M1 and M2 are turned in the above-indicated fashion are stored in the form of families of characteristic curves in storage devices or memories 5 and 6 which are connected to the rotary matrix computing means 3 and 4. The families of curves contained in the two storage devices 5 and 6 are thus obtained in the course of calibration runs which are carried out on rotary members having known test unbalances. Thus, in planes corresponding to the correction planes E1 and E2, such test rotary members have test unbalances, the magnitude and angular position of which are respectively known. Those test unbalances are provided on different rotary members, with different masses and mass moments of inertia about the axis of the respective rotary member and in different correction planes, that is to say at different spacings from the measuring planes which contain the measurement value sensors 1 and 2. For a given type of rotary member the test unbalances correspond to a mean unbalance to be expected, which is identified at $U_m$ in FIG 2.

Figure 2:
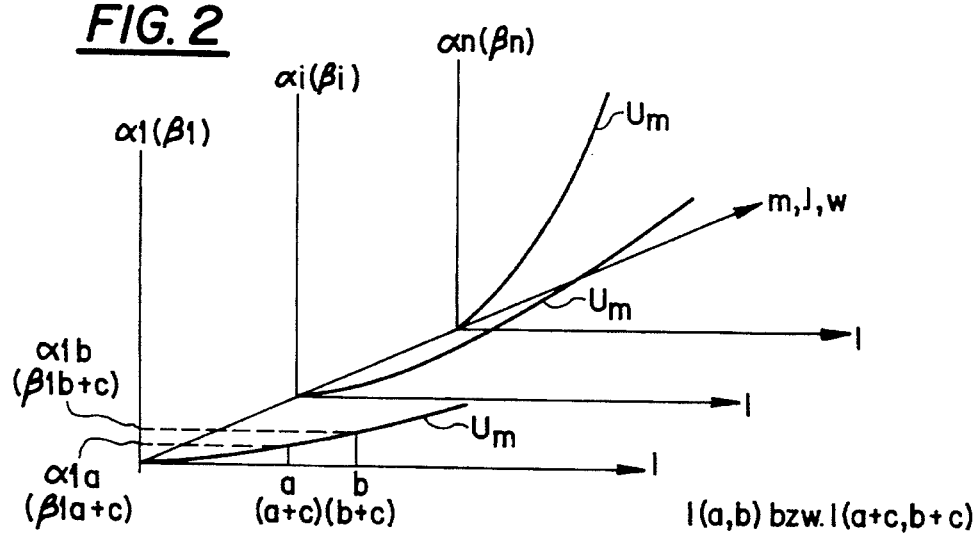

Looking therefore now at FIG. 2, phase shifts $\alpha s$ are firstly recorded in the form of a curve, for the measurement value sensor 1, in dependence on the spacings s of the correction planes from the measurement value sensor 1, such spacings being indicated at a, b and c in FIG. 1. Curves of that kind are also recorded for rotary members with different masses m. That procedure provides a family of curves for the phases shifts $\alpha s \ldots \alpha i \ldots \alpha n$ for n different types of rotors. The characteristic curves may also contain the mass moments of inertia $J_i$ and different measurement speeds of rotation $\omega_i$. That therefore gives characteristics $\alpha_i = f(s, m, J, \omega \ldots)$ for $i = s \ldots n$, as shown in FIG. 2. Those characteristics are stored in the storage device 5 in different section thereof. The mass moments of inertia are the moments about respective moment axes which extend perpendicularly to the axis of rotation of the rotary member 8.

The same procedure is carried out to ascertain characteristics $\beta_i = f(s, m, J, \omega \ldots)$ for $i = s \ldots n$ for the measurement value sensor 2, and the corresponding family of characteristics is stored in the storage device 6 in different sections thereof. The families of characteristic curves are shown in the graph in FIG. 2. Interpolation of the various characteristics obtained provides a characteristic area so that the corresponding angular values $\alpha_i$ and $\beta_i$ are obtained from the storage devices 5 and 6 for different types of rotary members to be balanced, on the basis of the mass which is known for the respective rotary member and the predetermined spacings of the correction planes from the measuring planes in which the measurement value sensors 1 and 2 are disposed. FIG. 2 diagrammatically illustrates three characteristic curves as being typical of a family of curves.

The two rotary matrix computing devices 3 and 4 contain a respective rotary matrix $T_\alpha$ and $T_\beta$:

$$T_{\alpha i} = \begin{vmatrix} \cos \alpha & -\sin \alpha \\ \sin \alpha & \cos \alpha \end{vmatrix}$$

-continued $$T_{\beta i} = \begin{vmatrix} \cos \beta & -\sin \beta \\ \sin \beta & \cos \beta \end{vmatrix}$$

As discussed above, the values in respect of the angles of rotation $\alpha$ and $\beta$ respectively are provided in dependence on the respective mass and the respective mass moment of inertia and the spacings of the correction planes on the rotary member to be balanced, the correction planes being those planes in which correction or balancing weights are fitted to the rotary member or in which a mass correction operation is carried out.

In the rotary matrix computing devices 3 and 4, the measurement value vectors M1 and M2 which are supplied by the evaluation unit or vector-forming device 11 are rotated by the corresponding angles $\alpha$ and $\beta$, thus providing compensated measurement vectors M'1 and M'2, in accordance with the following formulae:

$$M'1 = M1 \times T_\alpha$$

$$M'2 = M2 \times T_\beta.$$

The measurement value vectors M1 and M2 and the compensated measurement vectors M'1 and M'2 occur in x, y-components, in other words:

$$x'_1 = x_1 \cdot \cos \alpha_i - y_1 \cdot \sin \alpha$$

$$y'_1 = x_1 \cdot \sin \alpha_i + y_1 \cdot \cos \alpha$$

and in addition:

$$x'_2 = x_2 \cdot \cos \beta_i - y_2 \cdot \sin \beta$$

$$y'_2 = x_2 \cdot \sin \beta_i + y_2 \cdot \cos \beta.$$

For ascertaining the correction vectors U1 and U2 the two measurement value vectors M1 and M2 are rotated through mean values $\alpha_{mv}$ and $\beta_{mv}$ of rotary angles which are formed by mean value-forming devices as indicated at 12 and 13 in FIG. 1 from correction phases angles taken from the storage devices 3 and 4, so that the measurement value vectors M'1 and M'2 which are compensated in respect of the rotary angle errors are obtained for ascertaining the correction vectors U1 and U2.

For a type of rotary member as shown in FIG. 1, with the spacings a, b, a+c and b+c of the correction planes from the measuring planes in which the measurement value sensors 1 and 2 are disposed, the respective rotary angles are determined in the form of rotary angle mean values $\alpha_{mv}$ and $\beta_m$, in accordance with the following equation:

$$\alpha_{mv} = \frac{\alpha_a + \alpha_b}{2}$$

$$\beta_{mv} = \frac{\beta_{a+c} + \beta_{b+c}}{2}$$

wherein $\alpha_a$ denotes the angular value obtained in respect of the spacing a of the first correction plane E2 from the first measuring plane from the family of curves and wherein, $\alpha_b$ denotes the angular value obtained within respect to the spacing b of the second correction plane E1 from the first measuring plane from the family of curves. Also $\beta_{(a+c)}$ denotes the angular value obtained in respect of the spacing (a+c) of the first correction plane E2 from the second measuring plane from the family of curves and $\beta_{(b+c)}$ denotes the angular value obtained in respect of the spacing (b+c) of the second correction plane E1 from the second measuring plane from the family of curves.

Figure 3:
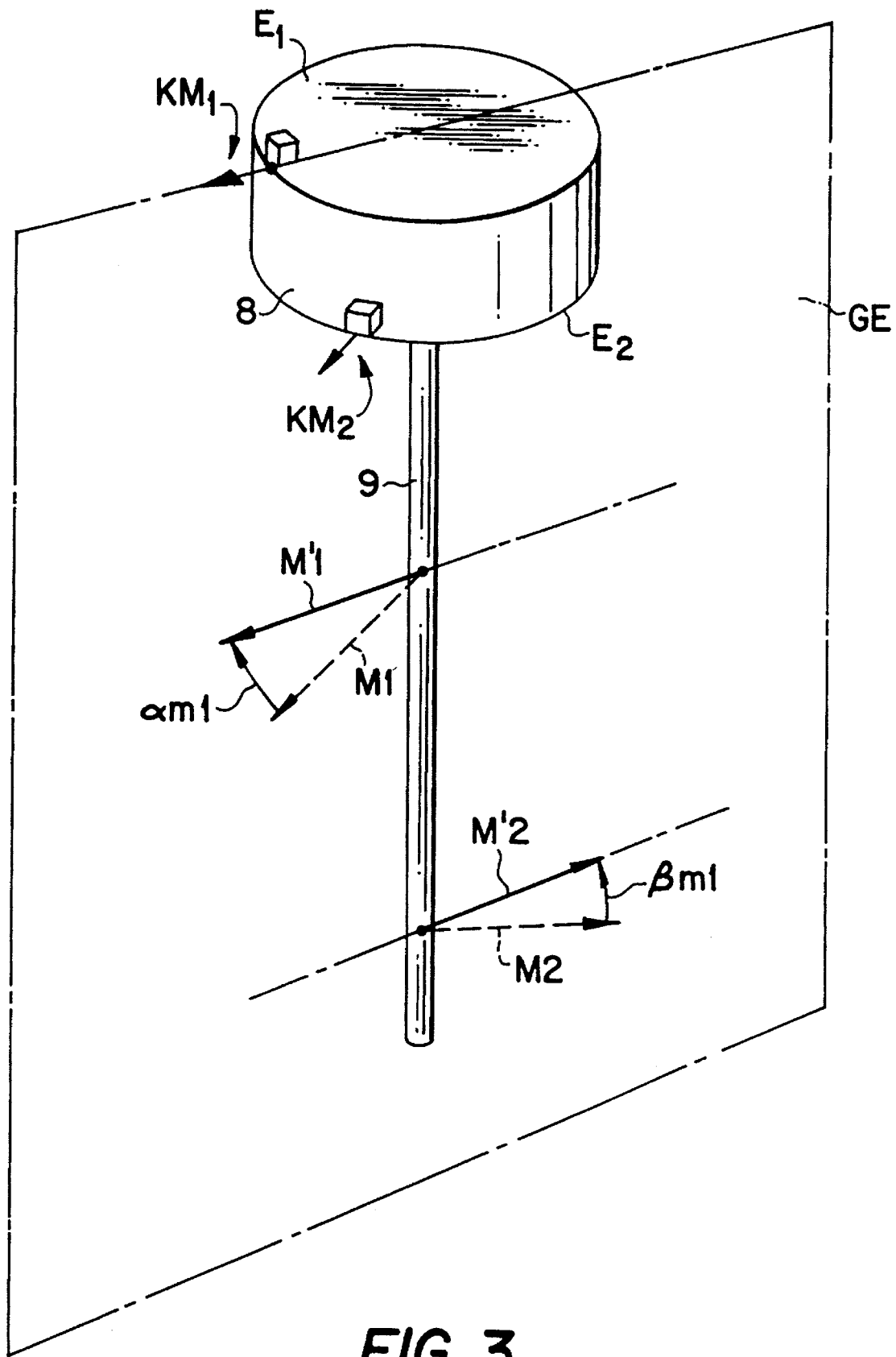
FIG. 3 is a diagrammatic representation of the function of the rotary matrix computing means.

Referring now to FIG. 3, shown therein is the situation involving ascertainment of the correction vector U1 in the correction plane E1.

The two mean value-forming devices 12 and 13 supply the mean values in respect of the correction angles $\alpha_{m1}$ and $\beta_{m1}$. The two measurement value vectors (Mv1) and M2 are turned through those correction angles. The two measurement vectors M'1 and M'2 which are compensated in respect of the rotary angle errors are disposed in a common plane as indicated at GE, which also contains the correction vector U1 which gives the correction mass and the angular position thereof. As already discussed above, the correction vector U1 is determined in the plane-computing device 7 which operates in accordance with conventional transfer conditions. In the case of a force-measuring machine which, as indicated above, operates below resonance or at an operating speed below the natural frequency of the system consisting of the rotary member 8 and its mounting assembly, those transfer conditions are based on static equilibrium conditions. The operation of determining the correction vector U2 in the correction plane E2 of the rotary member 8 is effected in the same manner, in which case the correction phase angles $\alpha_{mv2}$ and $\beta_{m2}$ are delivered by the two storage devices 5 and 6, by way of the mean value-forming devices 12 and 13. In this case also the measurement value vectors are then turned through the correction phase angles into a common plane which is generally different from the plane defined in FIG. 3 with respect to the correction vector U1 and which contains the correction vector U2 which is definitively determined by the computing device 7.

The measurement value vectors M'1 ($x'_1$, $y'_1$) and M'2 ($x'_2$, $y'_2$), which are compensated in respect of the rotary angle error, are fed to the plane-computing device 7 or plane separation (nodal) network for electrically performing the plane-separation function and in which the correction vectors U1 and U2 are thus calculated. The correction vectors U1 and U2 contain the mass corrections which are to be effected in the correction planes E1 and E2, together with the angular positions in which the mass correction operations are to be carried out, for example by fitting suitable balancing weights on the rotary member. The fact that the electrical computing means 7 receives measurement value vectors which are free from falsification phenomena resulting from phase shifts provides improved plane separation in the operation of determining the correction masses which are to be applied to the rotary member 8 to be balanced, in the correction planes E1 and E2, at appropriate angular positions. The plane-computing means 7, in consideration of the law of levers as mentioned above, transforms the two compensated measurement value vectors M'1 and M'2 from the measuring planes in which the measurement value sensors 1 and 2 are arranged into the correction planes E1 and E2 in conventional manner (see the above-mentioned publication Hofmann_Info-2, Imprint 05.88). That transformation operation provides the correction vectors U1 and U2 which give the correction masses and the angular positions at which the correction operation is to be carried out on the rotary member.

It will be appreciated that the above-described method and apparatus according to the present invention have been set forth solely by way of example and illustration thereof and that various other modifications and alterations may be made therein without thereby departing from the spirit and scope of the invention.

What is claimed is:

1. A method of dynamically balancing a rotary member in first and second correction planes on the rotary member, comprising the steps of:

ascertaining measurement value vectors during a measuring run corresponding to the rotary member unbalance in selected measuring planes of a measuring apparatus;

calculating the correction phase angles $\alpha_{mv}$ and $\beta_{mv}$ from phases shifts being determined during calibration runs and stored in a family of characteristic curves, as phase differences between the angles position of a known calibration unbalance vector in each of the first and second correction planes and the thereby achieved measurement value vectors in accordance with the following equations:

$$\alpha_{mv} = \frac{\alpha_a + \alpha_b}{2}$$

$$\beta_{mv} = \frac{\beta_{(a+c)} + \beta_{(b+c)}}{2}$$

wherein $\alpha_a$ is the phase shift obtained in the first measuring plane having a spacing (a) from the first correction plane, $\alpha_b$ is the phase shift obtained in the second correction plane having a spacing (b) from the first measuring plane, $\beta_{(a+c)}$ is the phase shift in the second measuring plane having a spacing (a+c) from the first correction plane, and $\beta_{(b+c)}$ is the phase shift obtained from the second correction plane having a spacing (b+c) from the second measuring plane;

turning the measurement value vectors through correction phase angles $\alpha_{mv}$ and $\beta_{mv}$, specific to the rotary member and dependent on given rotary member parameters, into a common plane which contains an angular position of a correction vector in a respective correction plane;

determining correction vectors for the correction planes on the rotary member from the turned measurement value vectors, and providing correction at the appropriate angular positions in the correction planes in dependence on the determined correction vectors.

2. A method as set forth in claim 1 wherein said family of characteristic curves is ascertained in dependence on at least two of the rotary member parameters including the mass of the rotary member, the geometrical dimensions thereof, positions of the correction planes and the speed of rotation of the rotary member.

3. A method as set forth in claim 1 wherein for the purposes of ascertaining the family of characteristic curves for a plurality of calibration rotary members each having a respective known unbalance and with different rotary member parameters at least two calibration runs are performed to measure the phase shifts in the measuring planes relative to the angular positions of the known unbalances in dependence on the rotary member parameters, the calibration run results being stored as the family of characteristic curves.

4. A method as set forth in claim 1 wherein the dependence of the phase shifts between the measurement value vectors and correction vectors is further ascertained for a mean moment unbalance and stored.

5. Apparatus for generation of correction vectors to correct for dynamic unbalance of a rotary member based on signals supplied as the effects of rotary member unbalance are detected in different measuring planes in an unbalance measuring assembly having first and second measurement value sensors adapted to supply the signals in dependence on the unbalance, the apparatus comprising: respective rotary matrix computing means connected between first and second measurement value sensors and a plane-computing means; respective storage means connected to the rotary matrix computing means and adapted to store phase shifts being ascertained during calibration runs specific to the type of rotary member as between the thereby achieved measurement value vectors and a known calibration vector in each of a first and a second correction plane in dependence on given rotary member parameters in the form of a family of curves for several types of rotary members, said rotary matrix computing means being operable to turn the measurement value vectors supplied by said sensors through respective correction phase angles $\alpha_{mv}$ and $\beta_{mv}$ which are calculated from the phase shifts determined during the calibration runs as phase differences between the angle position of a known calibration unbalance vector in each of the first and second correction planes and the thereby achieved measurement value vectors in accordance with the following equations:

$$\alpha_{mv} = \frac{\alpha_a + \alpha_b}{2}$$

$$\beta_{mv} = \frac{\beta_{(a+c)} + \beta_{(b+c)}}{2}$$

wherein $\alpha_a$ is the phase shift obtained in the first measuring plane having a spacing (a) from the first correction plane, $\alpha_b$ is the phase shift obtained in the second correction plane having a spacing (b) from the first measuring plane, $\beta_{(a+c)}$ is the phase shift in the second measuring plane having a spacing (a+c) from the first correction plane, and $\beta_{(b+c)}$ is the phase shift obtained from the second correction plane having a spacing (b+c) from the second measuring plane, and a plane-computing means adapted to effect transformation of the measurement value vectors into correction vectors for unbalance correction in the first and second correction planes.

6. An operational method for use in dynamically balancing rotary members, comprising the steps of:

performing a plurality of calibration runs on a plurality of rotary members having known unbalances and rotary member parameters, ascertaining correction phase angles from the results of said calibration runs which are dependent on the known unbalances and parameters, and storing said correction phase angles in a family of characteristic curves;

dynamically balancing a rotary member in first and second correction planes by performing a measuring run with the rotary member to be balanced in a measuring apparatus providing first and second measuring planes, detecting measurement value vectors during the measuring run as the effects of unbalance in said measuring planes of the measuring apparatus, calculating the correction phase angles $\alpha_{mv}$ and $\beta_{mv}$ from phase shifts being determined during calibration runs as phase differences between the angles position of a known calibration unbalance vector in each of the correction planes and the thereby achieved measurement value vectors in accordance with the following equations:

$$\alpha_{mv} = \frac{\alpha_a + \alpha_b}{2}$$

$$\beta_{mv} = \frac{\beta_{(a+c)} + \beta_{(b+c)}}{2}$$

wherein $\alpha_a$ is the phase shift obtained in the first measuring plane having a spacing (a) from the first correction plane, $\alpha_b$ is the phase shift obtained in the second correction plane having a spacing (b) from the first measuring plane, $\beta_{(a+c)}$ is the phase shift in the second measuring plane having a spacing (a+c) from the first correction plane, and $\beta_{(b+c)}$ is the phase shift obtained from the second correction plane having a spacing (b+c) from the second measuring plane, turning the measurement value vectors through the correction phase angles $\alpha_{mv}$ and $\beta_{mv}$ specific to the rotary member and dependent on given rotary member parameters into a common plane which contains an angular position of a correction vector in a respective correction plane;

determining correction vectors for the correction planes on the rotary member from said turned measured value vectors, and performing mass correction in the correction planes at corresponding angular positions on the rotary member for balancing thereof in dependence on the correction vectors.

* * * * *